A. CALLESON.
BOTTLE FILLING MACHINE.
APPLICATION FILED FEB. 23, 1918.
1,358,931.
Patented Nov. 16, 1920.
6 SHEETS—SHEET 4.
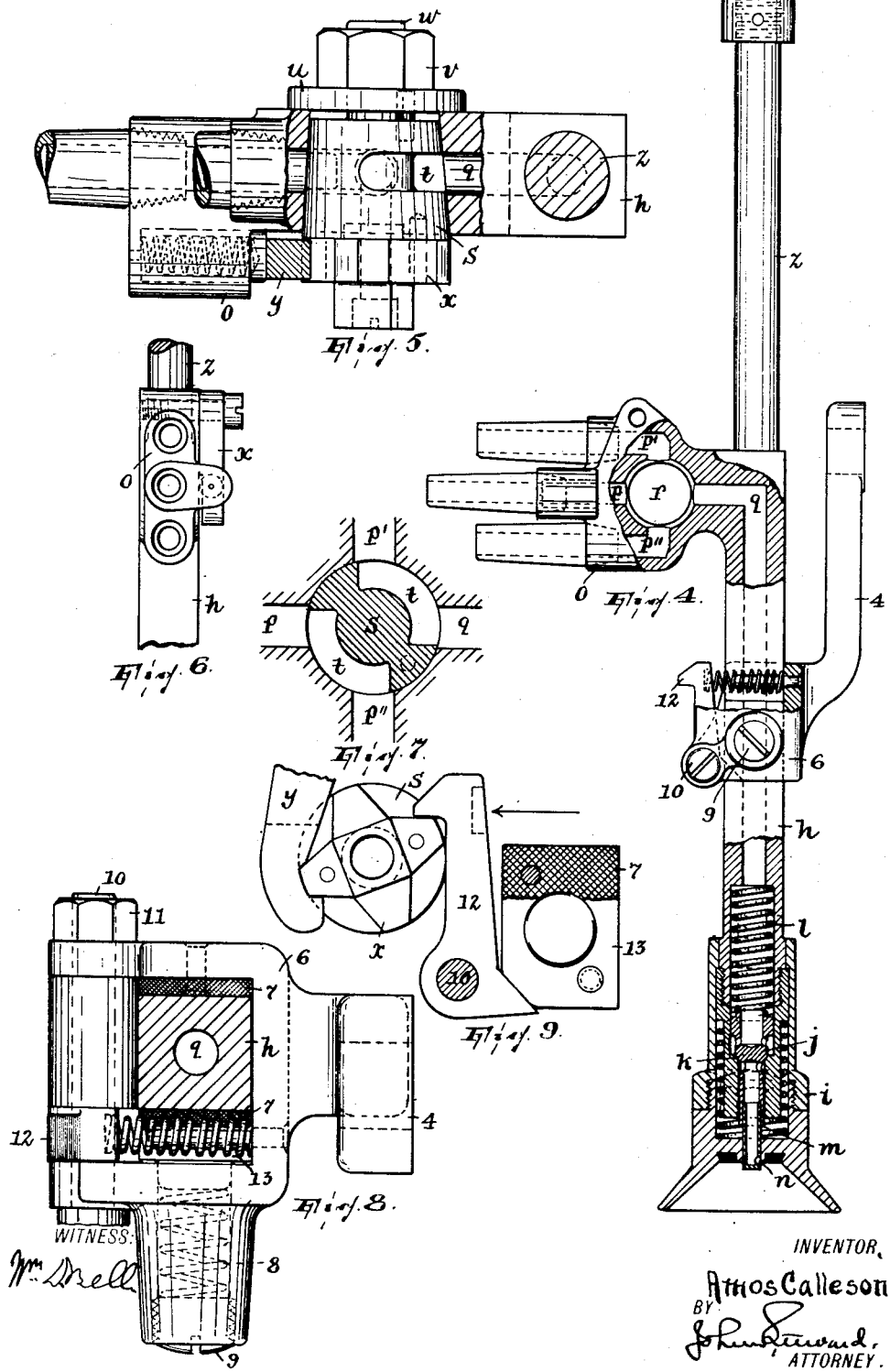
INVENTOR,
Athos Calleson,
BY
ATTORNEY.

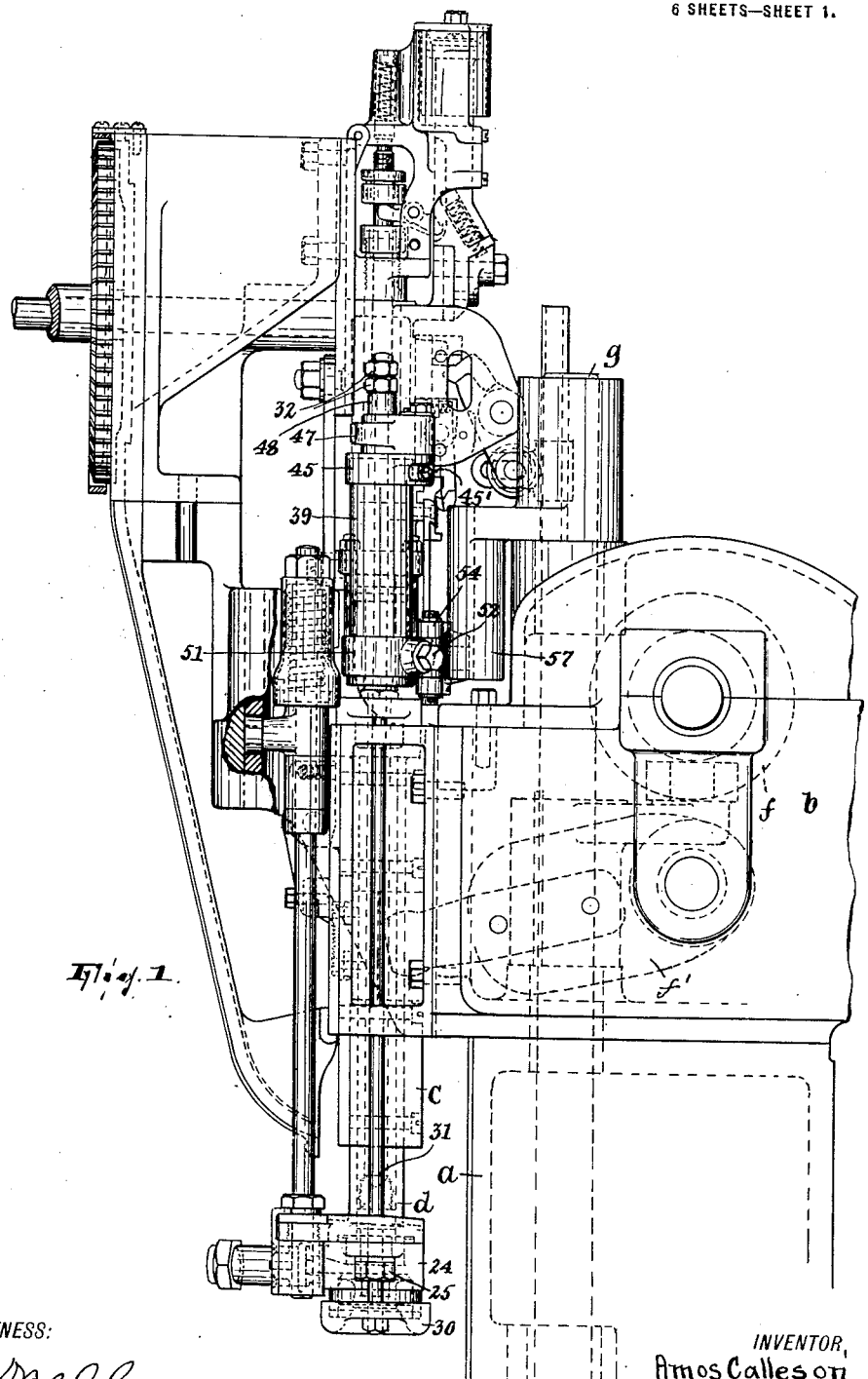

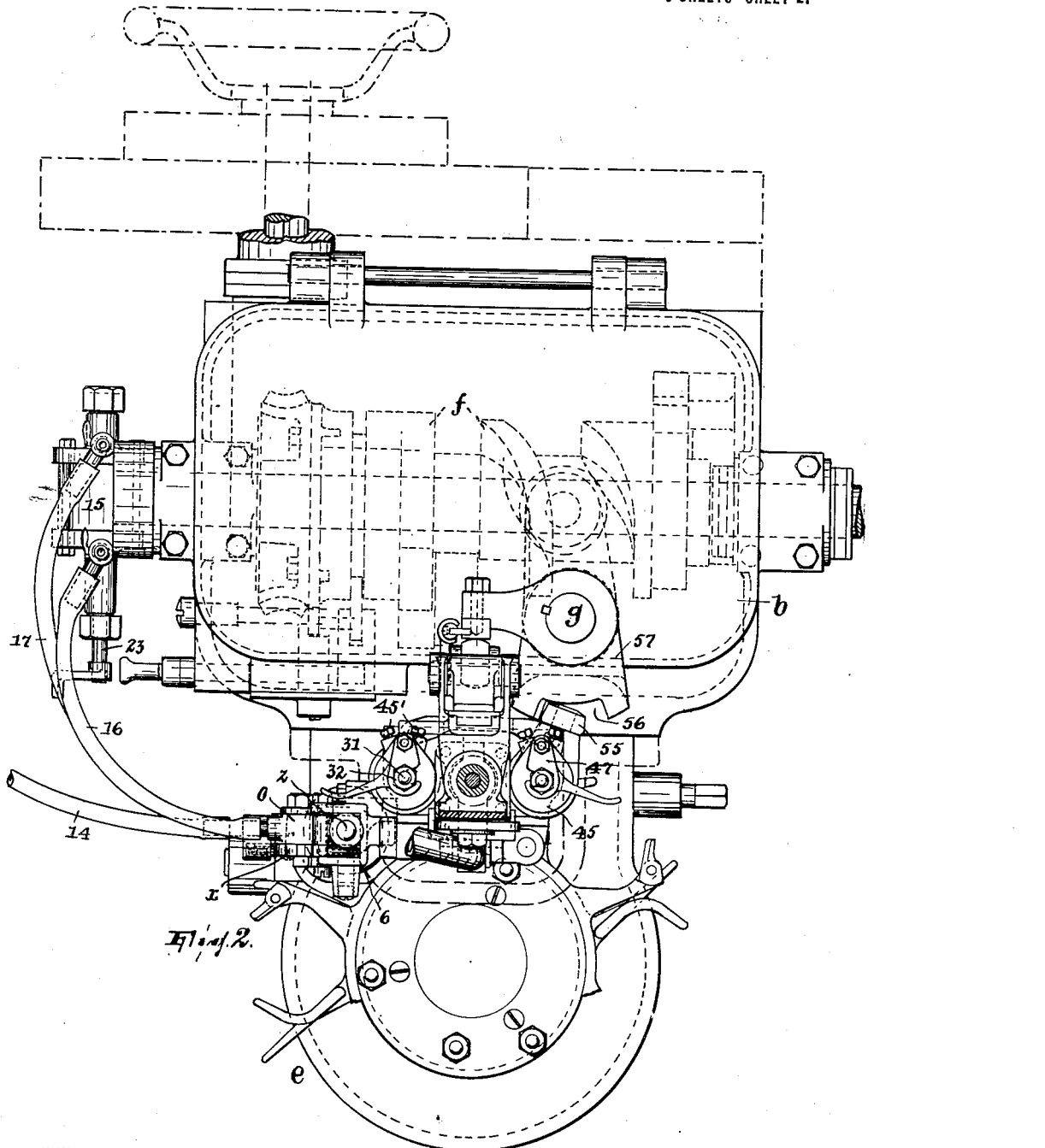

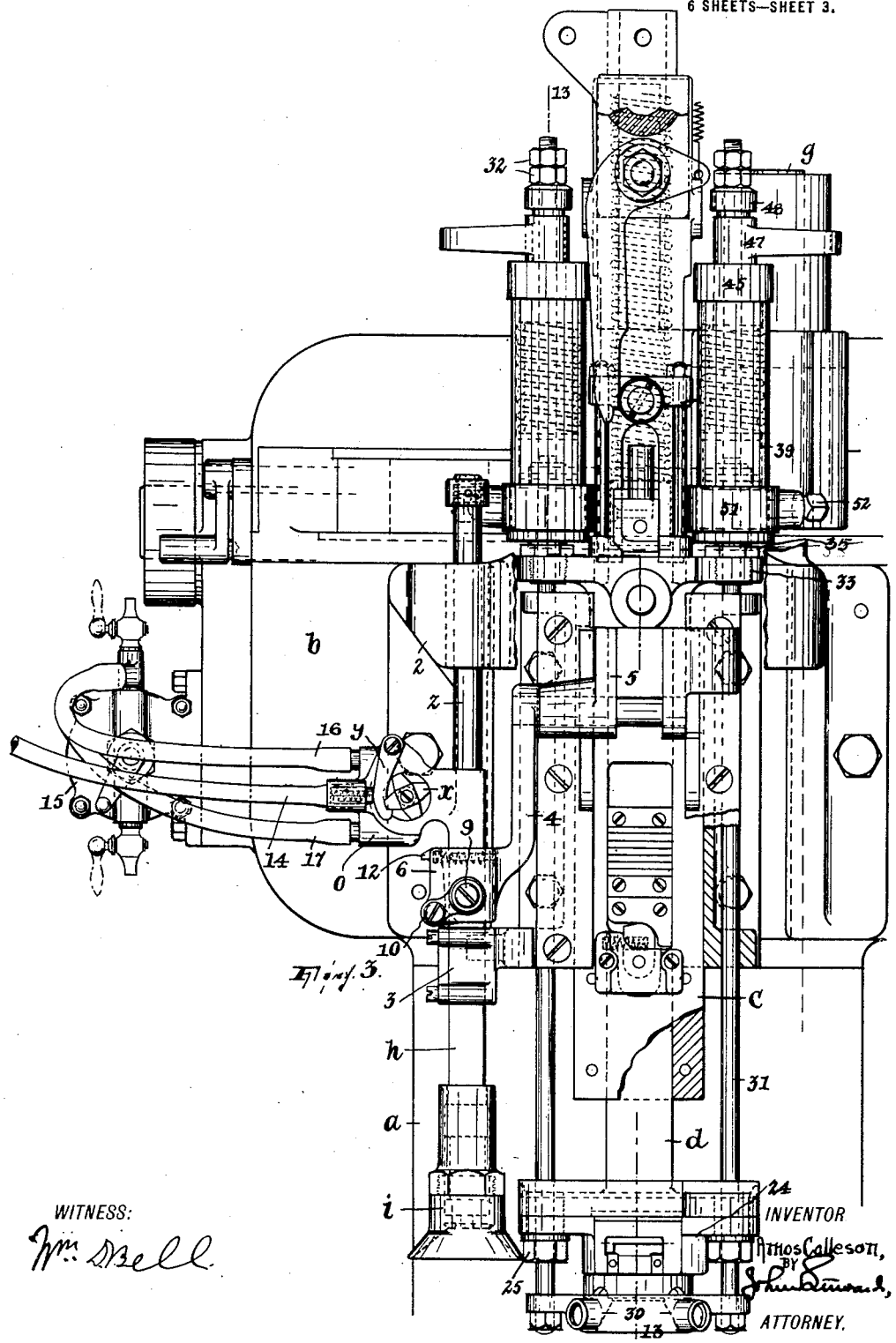

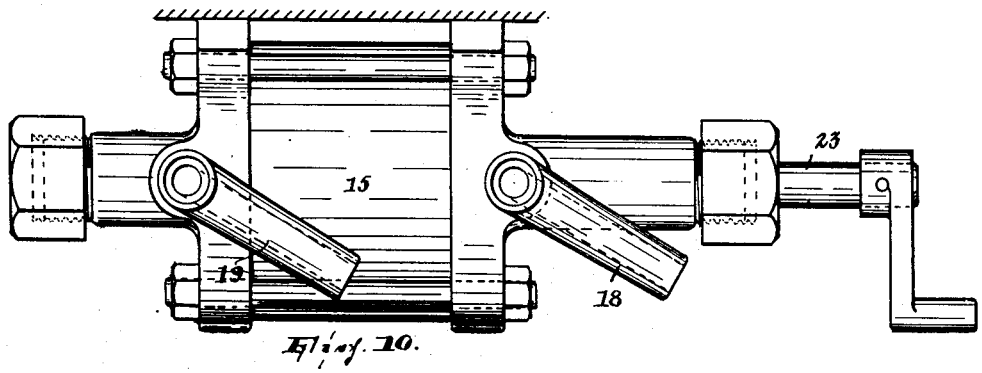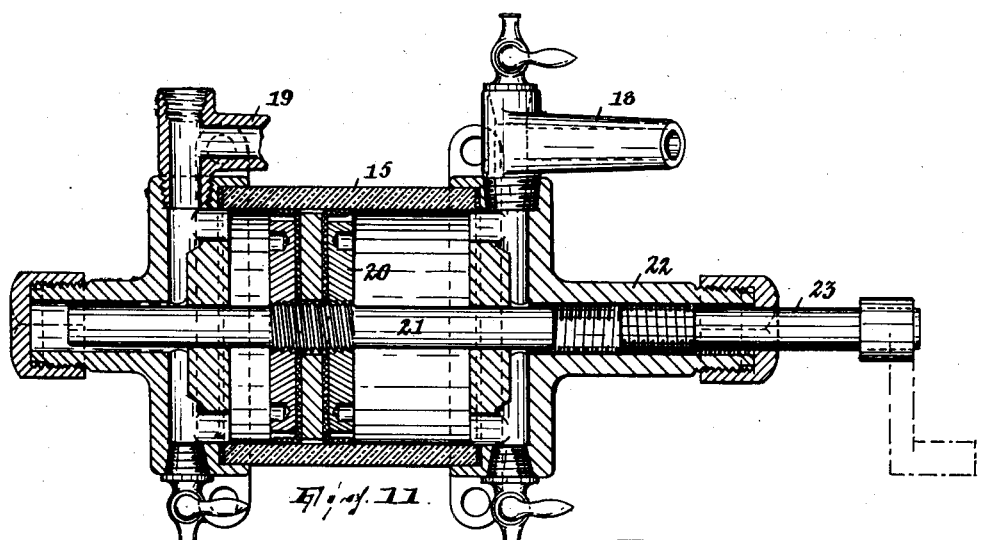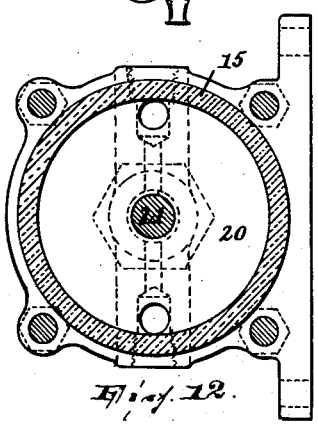

A. CALLESON.
BOTTLE FILLING MACHINE.
APPLICATION FILED FEB. 23, 1918.
1,358,931. Patented Nov. 16, 1920.
6 SHEETS—SHEET 6.
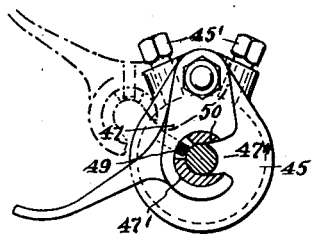
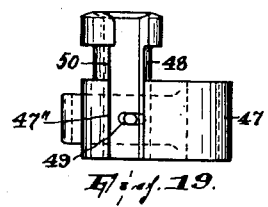
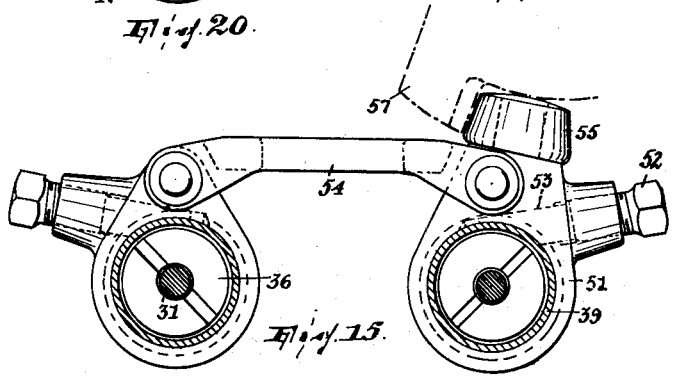
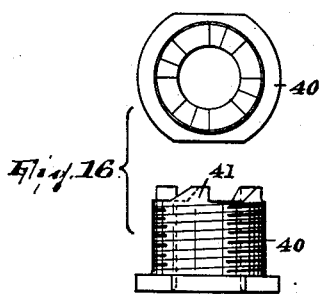
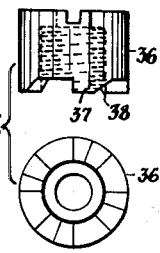
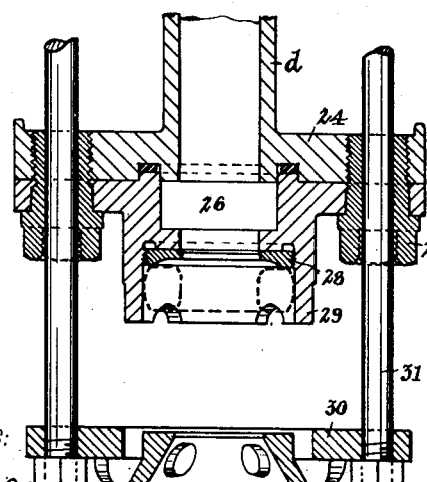
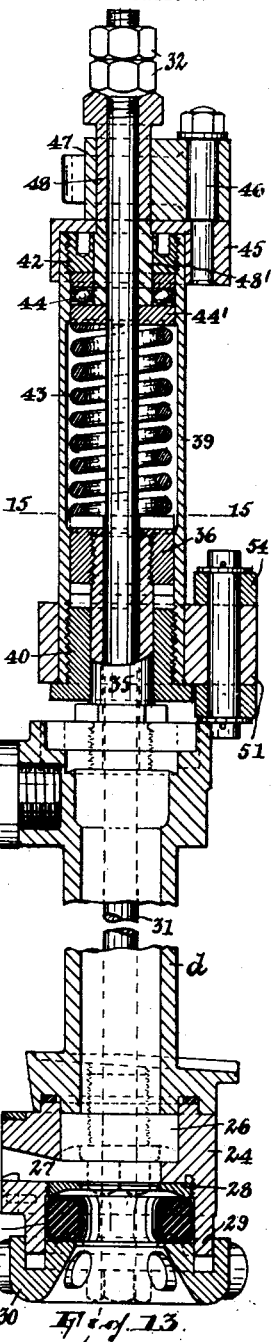
WITNESS:
Wm. Bell.
INVENTOR,
Amos Calleson,
BY John Steward,
ATTORNEY.

UNITED STATES PATENT OFFICE.

AMOS CALLESON, OF BROOKLYN, NEW YORK, ASSIGNOR TO ADRIANCE MACHINE WORKS, INC., OF BROOKLYN, NEW YORK, A CORPORATION OF NEW YORK.

BOTTLE-FILLING MACHINE.

1,358,931.

Specification of Letters Patent.

Patented Nov. 16, 1920.

Application filed February 23, 1918. Serial No. 218,658.

*To all whom it may concern:*

Be it known that I, AMOS CALLESON, a citizen of the United States, residing at Brooklyn, in the county of Kings and State of New York, have invented certain new and useful Improvements in Bottle-Filling Machines, of which the following is a specification.

This invention relates to filling and sealing bottles or other containers, and it consists in certain improvements in such machines—designed especially for but not necessarily limited to application to the machine patented to me January 8, 1918, No. 1,252,881—involving the delivery of a liquid, as syrup, to the bottle, and also the delivery of a liquid, as carbonated water, under pressure.

In the accompanying drawings,

Figure 1 is a side elevation of the machine embodying the present improvements;

Fig. 2 is a plan view thereof, partly in section;

Fig. 3 is a front elevation, certain parts being removed;

Fig. 4 is a front elevation, partly in section, of the syrup dispensing means, the valve proper of its switching valve being removed;

Fig. 5 is a plan, partly in section, of what is shown in Fig. 4, the valve proper being in place;

Fig. 6 is a fragmentary side elevation of what is shown in Fig. 4;

Fig. 7 is a sectional view of the switching valve proper in a plane transverse of its axis;

Fig. 8 is a plan view of the friction-grip holder for the dispensing means, the tubular stem of which appears in section;

Fig. 9 is a detail of the means for operating the switching valve;

Fig. 10 is a plan view of the syrup measuring cylinder and piston;

Figs. 11 and 12 are respectively horizontal and vertical sectional views thereof;

Fig. 13 is a vertical sectional view of the compensating slide, filling head, elastic gasket, and means to control the contraction and expansion of the latter, the section being taken on substantially the line 13—13 of Fig. 3;

Fig. 14 shows, in section, the lower portion of what is shown in Fig. 13, the mouth-piece part of the filling head being lowered and the gasket removed;

Fig. 15 shows the means to control the contraction and expansion of the gasket in section on line 15—15, Fig. 13;

Fig. 16 shows the cam-portion of one of the movable cam or nut devices in plan and side elevation, and Fig. 17 shows in side elevation and plan the fixed cam or nut device;

Fig. 18 shows a certain post on which are arranged, one fixed and the other movable, said cam devices; and Figs. 19 and 20 show respectively in side elevation and in plan, partly in section, a certain pivoted chock included in said means, Fig. 20 also showing cap 45.

The pedestal $a$ and housing $b$ of the frame; the carrier or main slide $c$ movable up and down in suitable ways at the front of the housing; the compensating slide $d$ vertically slidable in the main slide and carrying at its lower end the sealing head to be described in detail; the bottle supporting and advancing means generally denoted by the character $e$ in Fig. 2, and adapted to advance the bottles step by step, each time depositing an empty bottle in position to receive syrup and another, already containing its supply of syrup, in position to receive the carbonated water and be then sealed; the means for reciprocating the main slide including the lever $f'$ adapted to be oscillated by the cam means generally denoted in Figs. 1 and 2 by $f$; the vertical rock-shaft $g$ adapted to be oscillated by said cam means and through suitable connections to actuate the bottle advancing means on each cycle of movement of the main slide, and also adapted, during the part of said cycle of movement of the main slide when the latter is depressed, to cause relaxation of the pressure on the hereinafter mentioned gasket 34 in the sealing head so that the gasket, theretofore held gripping the bottle neck, will release the same and slip downward thereon more or less freely, are or may be all substantially the same as in my patent hereinbefore mentioned.

*Syrup dispensing.*—In that the tubular receiver $h$ has an upwardly yielding and downwardly spring-pressed mouth-piece $i$ and an upwardly yielding valve $j$ normally held down against its seat $k$ by a spring $l$, being adapted to be (relatively) elevated to opening position when the mouth-piece impinges the bottle by contact of said mouth-piece with a shoulder m on the valve stem, the tubular receiver in the present case is the same as that in my patent. In the present case, the discharge outlet n of the valve is arranged at the side thereof, so that the syrup will be delivered against the side of the bottle and thus produce a more or less extended film of syrup, to insure a better mixing of the syrup with the carbonated water when the latter is fed into the bottle. The tubular receiver in the present case has no upwardly seating valve. The upper end of the receiver is turned off to form a nipple cluster o comprising three nipples, the ports p, p', p" of which on the one hand and the passage q of the tubular receiver on the other communicate with the valve chamber r of the valve casing which the turned off portion of the receiver forms. In the valve chamber is a rotary valve s formed with two opposite segmental ports t of such form that when the valve is given quarter-turns the flow through the nipple cluster will be alternately from port p to port p" and from port p' to passage q, and then from port p" to passage q and from port p to port p'. The valve and its chamber are tapering and the valve is held in place by a washer u and a nut v screwed on a threaded stem w of the valve. The valve has a projecting four-point ratchet or star wheel x, and a spring-pressed pawl y holds it in each of the quarter turn positions to which it is moved. The body of the receiver and an extension stem z thereof respectively slide in suitably fixed guides 2, 3. The receiver is made to rise and fall with the main slide by a friction-grip device consisting of an arm 4 affixed to a suitable projecting part 5 of the main slide and having a U-shaped extremity 6 receiving the body part of the receiver (Figs. 3, 4 and 8) and containing leather or other opposite friction grip elements 7 and a spring 8 to cause said elements to exert clamping pressure on opposite faces of the receiver, the spring being backed by an adjusting screw 9. A screw 10, held in place by a nut 11, connects the extremities of the portion 6 of the arm 4 and affords a pivot for a spring-pressed pawl 12 whose outward movement under pressure of its spring is limited by a metal block 13 preferably interposed between spring 8 and the adjoining friction grip element 7. This pawl is adapted on each rise of the arm 4 with the main slide to click past the adjoining point of the star wheel x, and on the ensuing downstroke to rotate the valve s a quarter turn. It will be understood that the slip grip which the arm 4 maintains on the receiver permits compensation for bottles exceeding a certain height to occur, the receiver in such cases slipping relatively upwardly in the arm 4; whenever such upward displacement occurs, on the ensuing upstroke the receiver is reset downwardly by contact with some fixed part, as of its mouth portion with the guide 3.

The central port p of the nipple cluster is connected with a suitable syrup source under pressure by the tube 14. The other two ports p' and p" are connected with the opposite ends of the cylinder 15, shown best in Figs. 10, 11 and 12 and secured to the housing b, by tubes 16 and 17 fitted to nipples 18 and 19 on the cylinder. The piston 20 in this cylinder has its stem projecting into both ends of the cylinder, one end of which has a tubular internally threaded extension or stem 22 to receive the adjoining end of said stem 21; this internally threaded extension has screwed into it the threaded adjusting spindle or screw 23 which, according as it is entered more or less into the extension 22, obviously more or less limits the range of movement of the piston.

It will be seen that the supply source, the parts 16, 17 and 15—20, the switching valve and the receiver form a fluid delivery system in which the parts 16, 17 and 15—20 constitute a circuit-conductor interposed between the supply source and receiver and the switch valve constitutes means for switching the pressure first in one direction and then in the other through the circuit conductor; that the amount of fluid delivery on each change of position of the switch valve is limited because the piston-throw is limited; and that such amount is rendered variable by adjusting screw 23 and consequently the throw of the piston. The pawl 12 invariably turns the valve s a quarter-turn in each cycle of movement of the receiver with the main slide (i. e., at the outset of each downstrike) so that, while delivery of syrup never occurs unless a bottle is present to cause opening of valve j, pressure is present in the receiver sufficient to produce a discharge of syrup on each downstroke. The amount discharged is always equal to the amount which the piston, following each switching movement of the valve s, displaces and this may be adjusted to a nicety by adjusting the screw 23.

*Gasket control.*—While the gasket and its control means are herein described and shown in connection with an element (d) adapted to function as a compensating slide the same as in my said patent and to have certain other parts shown and described in said patent (but not here relevant) associated with it, it will be understood that the invention is not limited to the structure d having these qualifying elements.

The compensating slide or structure d has the filling (or sealing and filling) head 24 secured to its lower flanged end by cap 13 screws 25, the same having a chamber 26 for the closure affixing appliance, a closure inlet 27 and a closure supporting annular ledge 28 and a depending lip 29; 30 is the mouth-piece grooved to receive the annular depending lip 29 of the filling head, being carried by two long vertical rods 31 which have sliding bearings in the (tubular) cap screws 25 and are equipped at their upper ends with nuts or equivalent abutments 32, being arranged one at each side of the structure $d$ and projecting above the same and through lateral ears 33 thereon. The mouth-piece supports, interposed between itself and the ledge 28, the annular elastic gasket 34. The structure 30—31 forms in effect a stirrup to support and, in co-action with the filling head, exert compression on the gasket. Screwed fast into the ears 33 are the upwardly projecting posts 35, penetrated by the rods 31. Screwed fast onto the upper end of each post is a fixed nut or cam device 36 formed with regularly spaced downward projections having their lower faces 37 horizontal and their corresponding side faces 38 beveled in a manner equivalent to a screw thread or cam face. A movable nut or cam device is associated with each nut or cam device 36 and constructed as follows: 39 is a cylinder into the lower end of which is screwed fast a nut or cam member 40 (Fig. 16), which is the complement of the nut or cam device 36 (in that it has cam projections 41 which are reverse counterparts of those of the cam device 36) and is journaled on the post 35 below the same, and into the upper end of which cylinder is screwed fast a plug 42. A powerful spiral spring 43 is housed in the cylinder 39 and interposed between the cam device 36 and an anti-friction bearing—designated as a whole by 44—which bears against the plug 42 and the lower plate 44' of which directly assumes the thrust of the spring. Secured fast on the top of each cylinder 39 by set-screws 45' is a cap 45 in which on a stud 46 is fulcrumed a chock consisting of a lever 47 provided with a handle, as shown, and with a bearing 47', having a lateral entrance or opening 47'', for the tubular chock-proper 48 swiveled in such bearing and having the slot-and-pin connection 49 therewith, said chock-proper having the longitudinal slot 50 adapted to register with the entrance 47'' to said bearing, it being understood that such slot and said entrance permit the chock to be moved clear of rod 31 into and out of the position where the chock-proper underlies the abutment 32 on the rod and receives the latter in its bore (Figs. 13 and 20). When in this position the chock proper rests upon a tubular thrust-piece 48', in turn resting on the plate 44', and is thus adapted to transmit the upward pressure of the spring directly to the stirrup. The cam devices 39—40—42 are adapted to be turned clockwise, as seen in plan, to bring the horizontal faces thereof against those of the cam devices 36 and anti-clockwise to bring the cam projections of the two sets of cam devices into mesh with each other. In the first of these positions (Fig. 13) the cam devices 39—40—42 have been cammed down by the inclined faces of the cam projections, consequently lowering the mouth-piece 30 and reducing the pressure on the gasket, which relaxes and expands interiorly; in the second position the cam devices 39—40—42 and consequently the mouth-piece are full up, the gasket being held contracted to its minimum interior diameter. The chocks form portions of the cam devices, interposed between the caps 45 thereof and the abutments 32, which are withdrawable, by swinging them on their fulcra to the dotted line position shown in Fig. 20, so that the stirrup may be allowed to fall to the position shown in Fig. 14 thus to afford clear access to the gasket containing chamber, as for substituting for a worn gasket a new one; this operation of withdrawing the chocks so as to lower the stirrup is of course most readily effected when the cam devices 39—40—42 occupy the first position above mentioned, at which time the gasket will be in a state of considerably reduced compression. It is preferable that when the cam devices 39—40—42 are in the said first position the gasket be under some compression so that the downward pressure it thus exerts on the stirrup will produce sufficient friction between the abutments 32 and the chocks-proper to prevent the latter, which are manually turned in their bearings 47' to block the entrances 47'' thereto, from working out from under the abutments. It will be understood that the slot-and-pin connection 49 limits the rotary movement of the chocks-proper, so that it requires but a slight manual movement thereof to bring their slots into registry with the entrances 47''. Adjustment of the degree of compression of the gasket may be obviously effected by adjusting the abutment-forming nuts 32.

For effecting automatic expansion and contraction of the gasket in the filling of the containers, and in particular where, as herein shown, such expansion and contraction are to be coördinated with the operations of a machine like that set forth in my said Letters Patent, the following mechanism may be provided: A crank 51 embraces the basal portion of each cam device 39—40—42 and is secured fast thereto by a set-screw 52 which holds a tangential plug 53 binding the cylinder 39 against the cam member 40 (Fig. 15). The pair of cranks are connected by a link 54 and one of the cranks has a roller 55 engaged in a slot 56 (somewhat wider than the roller to allow some lost motion) in a crank 57 on shaft *g*. When the main slide is fully elevated the shaft *g* will stand at its limit of clockwise movement (see my patent aforesaid, page 6, line 110 *et seq.*) and the pair of rotatable cam devices at their limits of anti-clockwise movement, as seen in plan. (The main slide and shaft *g* are shown—Figs. 1 and 2—in the positions where the former has started to rise and the latter, having performed its working stroke so far as the control of the gasket is concerned—to wit, to release the gasket—has started its clockwise movement.) At that time the cam-projections of the rotatable and fixed cam devices will therefore be meshing with each other, wherefore the springs 43 hold the latter and hence the stirrup at their full upward limits, compressing the gasket into the contracted form in which it is to be forced down over the bottle mouth. When on descent of the main slide, as in my said patent, the bottle mouth having entered the contracted gasket and thereupon been filled and the closure having been introduced over the bottle mouth and a hermetic seal formed between them, the last part of the descending movement of the main slide for closure affixing occurs, crank 57 in now moving anti-clockwise brings the left side of its slot 56 against roller 55, so that the rotatable cam devices are rotated clockwise to the position where the horizontal faces of the cam-projections abut each other, involving compression of the springs and relaxation of the gasket, so that it can slip freely downwardly over the bottle neck. In the return or clockwise movement of the main slide, slot 56 permits some lost motion before the crank 57 at the right side of its slot engages and resets the rotatable cam devices to their initial position (thus to defer contraction of the gasket until the bottle has been ejected from the filling head), whereupon it rotates the rotatable cam devices now anti-clockwise, thus permitting the springs again to raise the stirrup and so contract the gasket.

Having thus fully described my invention, what I claim as new and desire to secure by Letters Patent is:—

1. In combination, container supporting means, fluid conducting means adapted to be connected to a fluid source and terminating in a dispenser, one of said means being movable relatively to the other to bring the container and dispenser into fluid-transferring relation to each other, a circuit-conductor having its ends connected to the fluid conducting means and including a cylinder and a piston therein, and means, actuated by one of the first two means on movement of one of them relatively to the other, to switch the fluid flow into the ends of said circuit-conductor alternately.

2. In combination, container supporting means, fluid conducting means adapted to be connected to a fluid source and terminating in a dispenser, one of said means being movable relatively to the other to bring the container and dispenser into fluid-transferring relation to each other, a circuit-conductor having its ends connected to the fluid conducting means and including a cylinder and a piston therein, and means to adjust the throw of the piston, and means, actuated by one of the first two means on movement of one of them relatively to the other, to switch the fluid flow into the ends of said circuit-conductor alternately.

3. In combination, container supporting means, fluid conducting means adapted to be connected to a fluid source and terminating in a dispenser and having a normally closed container-opened valve, one of said means being movable relatively to the other to bring the container and dispenser into fluid-transferring relation to each other, a circuit-conductor having its ends connected to the fluid conducting means and including a cylinder and a piston therein, and means, actuated by one of the first two means on movement of one of them relatively to the other, to switch the fluid flow into the ends of said circuit-conductor alternately.

4. In combination, container supporting means, fluid conducting means adapted to be connected to a fluid source and terminating in a dispenser, one of said means being movable relatively to the other to bring the container and dispenser into fluid-transferring relation to each other, a circuit-conductor having its ends connected to the fluid conducting means and including a cylinder and a piston therein, and a rotary valve, actuated by one of said means on movement of one relatively to the other, to switch the fluid flow into the ends of said circuit-conductor alternately.

5. In combination, container supporting means, fluid conducting means adapted to be connected to a fluid source and terminating in a dispenser, one of said means being reciprocatory relatively to the other to bring the containers one after the other and the dispenser into fluid-transferring relation to each other, a rotary valve-including device to control the flow through said fluid conducting means, and means on the supporting means to rotate said device step by step in the same direction on successive reciprocations of the reciprocatory means.

6. In combination, a fluid delivery structure, a gasket therein, a gasket compressing element movable away from said structure and means to hold said element against such movement including a cam device and a withdrawable chock.

7. In combination, a fluid delivery structure, a gasket therein, a pressure element to press the gasket against said structure movable away from the latter, and means to cause said element to exert pressure on the gasket including a cam device and a withdrawable chock.

8. In combination, a fluid delivery structure, a gasket therein, a pressure element to press the gasket against said structure movable away from the latter, and elastic means to cause said element to exert pressure on the gasket including a withdrawable chock.

9. In combination, a fluid delivery structure, a gasket therein, a depressible gasket supporting stirrup projecting up through said structure, and means, including a cam device and a withdrawable chock and arranged upon said structure, to support the stirrup.

10. In combination, a fluid delivery structure, a yielding gasket therein, means to exert pressure on the gasket, and means, rotative on an axis extending longitudinally of the axis of the gasket, for forcing the pressure means in a direction counter to its pressure thrust.

11. In combination, a fluid delivery structure, a yielding gasket therein, means to exert pressure on the gasket, and cam means, rotative on an axis extending longitudinally of the axis of the gasket, for forcing the pressure means in a direction counter to its pressure thrust.

12. In combination, the frame, a fluid delivery structure movable up and down therein, an expansible and contractible gasket in said structure, means, rotative in said structure on an axis extending longitudinally of the axis of the gasket, for controlling the expansion and contraction of the gasket, and coördinate means to move said structure and actuate the first-named means.

13. In combination, the frame, a fluid delivery structure movable up and down therein, an expansible and contractible gasket in said structure, means movable in said structure laterally for controlling the gasket, and an actuator movable laterally in the frame, said means and actuator having a sliding up and down and lateral lost-motion connection with each other.

In testimony whereof I affix my signature.

AMOS CALLESON.